United States Patent [19]

Henderson

[11] Patent Number: 4,999,703
[45] Date of Patent: Mar. 12, 1991

[54] AUTOMATIC IMAGE CORRECTION METHOD AND APPARATUS FOR PROJECTORS UTILIZING CATHODE RAY TUBES

[75] Inventor: Alan R. Henderson, Carlsbad, Calif.

[73] Assignee: Hughes Aircraft Company, Los Angeles, Calif.

[21] Appl. No.: 290,017

[22] Filed: Dec. 23, 1988

[51] Int. Cl.[5] .............................................. H04N 9/31
[52] U.S. Cl. ........................................ 358/60; 358/10; 358/64; 358/139; 315/368
[58] Field of Search ........................ 358/10, 60, 61, 66, 358/69, 64, 63, 67, 65, 68, 139; 315/10

[56] References Cited

U.S. PATENT DOCUMENTS

| | | | |
|---|---|---|---|
| 4,193,086 | 3/1980 | Kawaguchi | 358/10 |
| 4,441,120 | 4/1984 | Gerritsen | 358/139 |
| 4,485,394 | 11/1984 | Ghaem-Maghami et al. | 358/10 |
| 4,573,073 | 2/1986 | Corby, Jr. | 358/96 |
| 4,593,308 | 6/1986 | Kemplin | 358/139 |
| 4,593,309 | 6/1986 | Uno et al. | 358/10 |
| 4,602,272 | 7/1986 | Duschl | 358/10 |
| 4,672,275 | 6/1987 | Ando | 358/60 |
| 4,700,218 | 10/1987 | Thomsen et al. | 358/29 |
| 4,816,908 | 3/1989 | Colineau et al. | 358/60 |
| 4,857,998 | 8/1989 | Tsujihara et al. | 358/60 |

FOREIGN PATENT DOCUMENTS

0247692 10/1987 Japan .

Primary Examiner—James J. Groody
Assistant Examiner—Safet Metjahic
Attorney, Agent, or Firm—Terje Gudmestad; Jeannette M. Walder; Wanda K. Denson-Low

[57] ABSTRACT

A system for automatically achieving convergence of the individual color images emitted by a color projector (11). The system employs a test pattern generator (71) which generates a number of test patterns which are identical for each CRT of the projector (11). The test patterns are scanned across a light sensor (83) which produces an output signal each time a portion of the test pattern crosses the sensor (83). The output signal causes a scanner processor (91) to latch the positions at which respective crossings are detected. The differences in position of the respective test patterns at each location examined by the sensor (83) represents misconvergence of the individual color images at the respective location. These differences are determined and interpolated by an image processor (61) and stored in a memory (63) to generate correction signals for correcting the misconvergence. The same apparatus is also used to automatically correct for misconvergence during projector operation by examining test pattern disparities in small blacked out areas around points stored in memory during the initial misconvergence adjustment. Spatial gray scale correction is also automatically achieved by generating a correction signal which cancels the amplitude offset variations between spatial illumination profiles of flat field test patterns at 100% and 1% amplitude levels. Video gain adjustment is automatically achieved by generating a correction signal which cancels the amplitude offset variations between spatial illumination profiles of flat field test patterns at 100% and 60% amplitude levels.

12 Claims, 7 Drawing Sheets

AUTOMATIC IMAGE CORRECTION METHOD AND APPARATUS FOR PROJECTORS UTILIZING CATHODE RAY TUBES

BACKGROUND OF THE INVENTION

1. Field of the Invention

The subject invention relates generally to image displays, and more particularly to apparatus for automatically correcting misconvergence and amplitude errors of color images generated by CRTs in a color display projector.

2. Description of the Prior Art

In the prior art, convergence correction of CRT images generated in color projectors has been laboriously approximated manually prior to use of the projector. Such convergence correction requires skilled personnel to adjust a large number of potentiometers, which often interact. During this time consuming manual convergence process, position drift caused by electronic or mechanical component temperature changes often occurs, making accurate convergence over the entire image area very difficult. Spatial gray scale correction has also been done manually and is similarly time consuming and difficult.

Another prior art approach to convergence adjustment utilizes light sensors built into the projection screen along the edges of the intended display. This approach has the advantage of automatic control, however, only size and centering of the image are controlled. The approach is limited to fixed installations, i.e., those where the projector apparatus is in fixed relation with the display screen, such as in a standard television set. It is further not adaptable to aspect ratio or size differences required when different video sources are used, and does not provide linearity corrections needed for convergence inside the display boundary.

The foregoing prior art approaches also do not address the problem of misconvergence caused by electronic and mechanical drift during operation of the projector. Such drift inevitably results from temperature changes and vibration during operation of conventional display projectors.

SUMMARY OF THE INVENTION

Accordingly, it is an object of the invention to improve color image display apparatus;

It is another object of the invention to provide apparatus for automatically converging primary color light beams in a color image display apparatus where the projector may be variously positioned with respect to the display screen, e.g., at varying distances from the display screen;

It is another object of the invention to provide misconvergence correction apparatus capable of automatic gray scale correction; and It is another object of the invention to provide color image display apparatus featuring automatic misconvergence correction during projector operation.

According to the invention, a test pattern for each primary color image is projected on a viewing screen and light reflected from the screen is imaged on and scanned across a light sensor by a scanning system. The positions at which the light sensor detects the test pattern at each of a number of screen locations for each color image are stored in memory. The positions are thereafter processed to determine correction values for automatically adjusting the primary color images to achieve convergence over the entire viewing screen. The approach may also be employed to automatically correct for misconvergence during operation of the projector. Additionally, automatic spatial gray scale adjustments are achieved by generating amplitude offset values selected to cancel amplitude offset variations between illumination profiles of flat field test patterns at reduced and unreduced amplitudes.

BRIEF DESCRIPTION OF THE DRAWINGS

The just-summarized invention will now be described in detail in conjunction with the drawings of which.

DETAILED DESCRIPTION OF THE PREFERRED EMBODIMENTS

Figure 1:
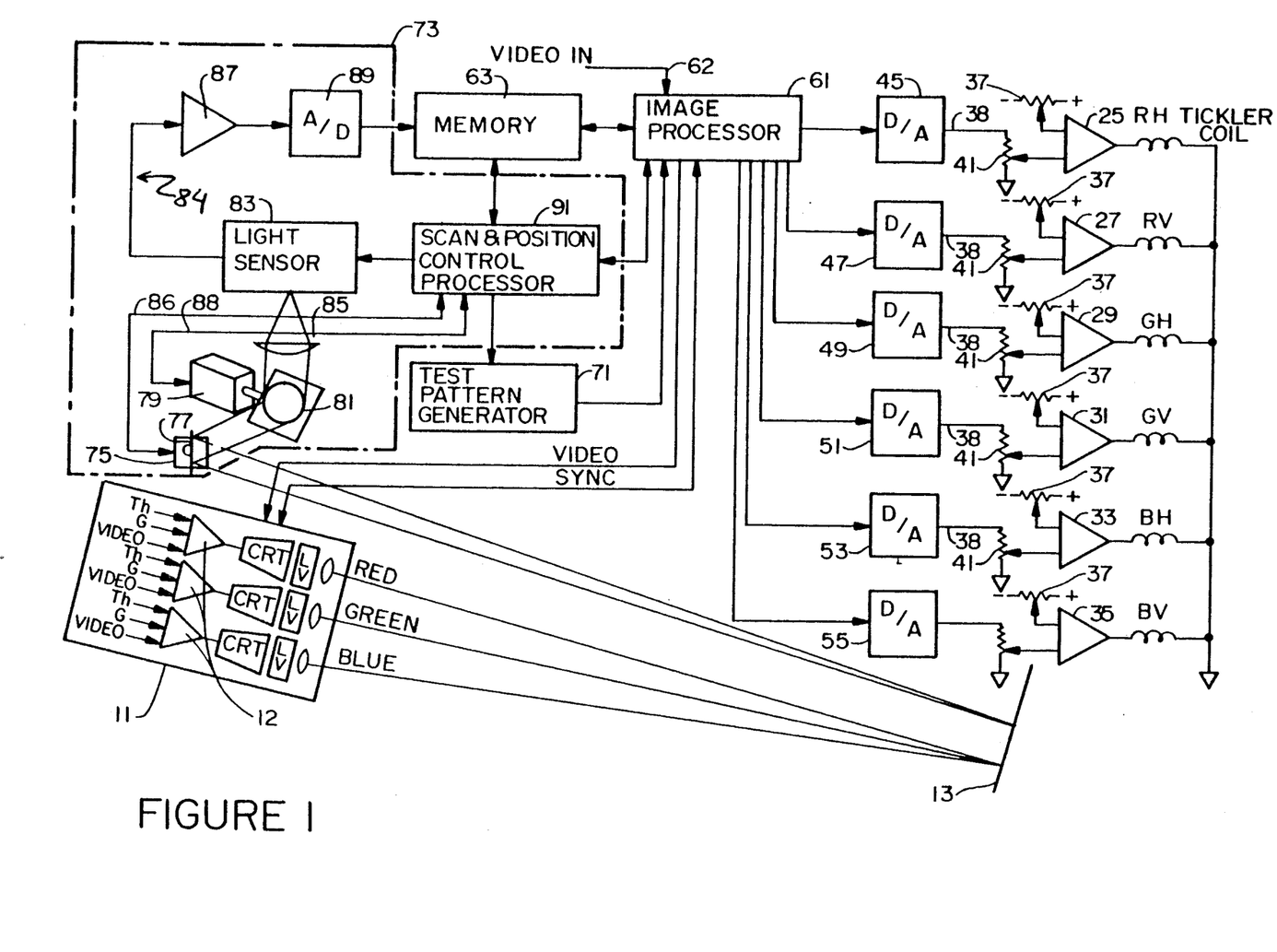
FIG. 1 is a block diagram of the preferred embodiment of the invention.

FIG. 1 illustrates a conventional projector 11 employing three cathode ray tubes (CRTs) and liquid crystal light valves LV to generate respective red, green and blue light images, which are reimaged onto a projection screen 13. The images are formed by the CRTs in a raster scan format, which may be a standard TV raster or other rasters, generated, for example, by various computers. The CRTs control the light output of the liquid crystal light valves LV, as known in the art. The projector 11 also includes video amplifiers 12, each of which receives threshold and gain control signals Th, G and a video signal. Main horizontal and vertical deflection amplifiers (not shown) control the rough positioning of the CRT electron beam for each CRT, as known in the art.

Associated with each CRT of the projector 11 is a respective pair of horizontal and vertical tickler coils RH, RV; GH, GV; BH, BV. As known in the art, these tickler coils RH, RV; GH, GV; BH, BV are used to adjust the position of the respective red, green and blue images generated by the CRTs of the projector 11 in order to properly converge the images.

A respective amplifier 25, 27, 29, 31, 33, 35 supplies each of the tickler coils RH, RV; GH, GV; BH, BV with a drive signal proportional to the correction required. Each amplifier 25, 27, 29, 31, 33, 35 may include a centering adjustment potentiometer 37 as shown. Each amplifier 25, 27, 29, 31, 33, 35 is supplied with an input signal on a line 38 from a respective digital-to-analog (D/A) converter 45, 47, 49, 51, 53, 55. Each input signal is subject to amplitude adjustment by a respective input potentiometer 41.

In FIG. 1, the projection circuitry to the right of the D/A converters 45-55 is conventional. However, in contrast to typical prior art apparatus wherein potentiometers have been used to manually adjust the input signals to the amplifiers 25-37, the preferred embodiment provides an image processor 61 and a memory 63 to automatically control the correction signals supplied to the tickler amplifiers 25-37 through the D/A converters 45-55. These components 61, 63, 45-55, as well as the conventional circuitry including the amplifiers 25-35 and tickler coils RH, RV; GH, GV; BH, BV, are preferably physically associated with the projector 11, for example, mounted within the same housing.

The memory 63 stores digital values representative of the corrections to be applied by the tickler coils 25-35 at various points along the raster scan of each of the CRTs of the projector 11. To develop these digital values, a test pattern of each color is projected onto the projection screen 13, the respective test patterns are scanned, and comparisons of the patterns are made. Accordingly, the circuitry of FIG. 1 further includes a test pattern generator 71 physically associated with the projector 11, and a scanning system 73.

The scanning system 73 includes a motor 75, a vertical scan mirror 77 driven by the motor 75, a motor 79, a horizontal scan mirror 81 driven by the motor 79, a light sensor 83, a lens 85, an amplifier 87, an analog-to-digital (A/D) converter 89, and a scan and position control processor 91. The motors 75, 79 are preferably stepping motors equipped to generate a digital count indicative of position on the display screen 13. Such stepping motors per se are well-known in the art. Optical encoders could also be used to generate appropriate counts. In either case, the encoding apparatus includes a repeatable reference limit switch, also as known in the art. The digital position values generated by the encoding apparatus are transferred to the scan processor 91 over respective lines 86, 88. These lines 86, 88 are indicated as bidirectional, serving also to transmit motor control signals from the scan processor 91 to the motors 75, 79.

It will be noted that the scanner system 73 may be physically separated from the remainder of the components of the system associated with the projector 11, for example, by an RS232 interface. The ability to physically separate the scanner system proves advantageous in accommodating arrangements wherein the projector 11 is located at varying distances from the screen 13 or where a translucent rear projection screen is used.

The motors 75, 79, the mirrors 77, 81 and the lens 85 serve to scan a portion of the test pattern reflected by the projection screen 13 across the light sensor 83. The light sensor 83 supplies outputs on a line 84 which are amplified by the amplifier 87, digitized by the A/D converter 89, stored in the memory 63, and used by the scan processor 91 to detect a test pattern crossing. When a test pattern crossing is detected, the scan processor 91 causes storage of the digital position values developed by the position encoder or counters associated with the motors 75, 79. These digital values are stored in the memory 63 and processed by the image processor 61 to determine correction values for the tickler coils RH, RV; GH, GV; BH, BV, as will now be described in more detail.

Figure 2:
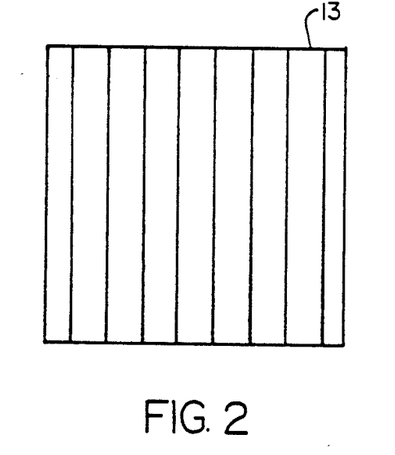
FIG. 2 is a front view of a display illustrating a vertical line test pattern according to the preferred embodiment.
Figure 3:
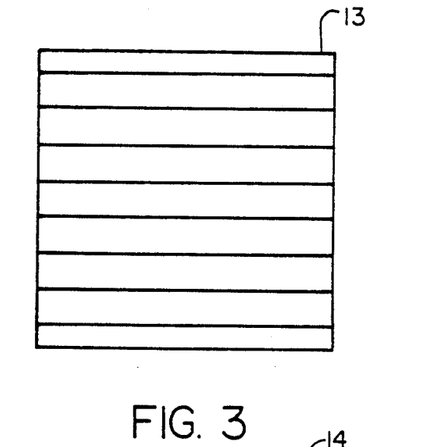
FIG. 3 is a front view of a display illustrating a horizontal line test pattern according to the preferred embodiment.

In the preferred embodiment, the test pattern generator 71 generates a test pattern of vertical lines, as shown in FIG. 2, and a test pattern of horizontal lines, as shown in FIG. 3. In actual practice, the test pattern lines will be distorted, exhibiting undulations and skewing. The test pattern is supplied to the image processor 61, which adds sync signals and translates the signals to appropriate video levels, so that the signals may be used by the display projector 11. A separate video input 62 may be provided for supplying additional test patterns or other video information to the screen through the image processor 61. It may be noted that other test patterns could be used in alternative embodiments, as long as comparison of respective pattern positions at various locations of the screen is provided. For example, a test pattern comprising a matrix of dots as shown in FIG. 4 could be used in an embodiment employing a raster scanned camera as a light sensor 83.

Figure 4:
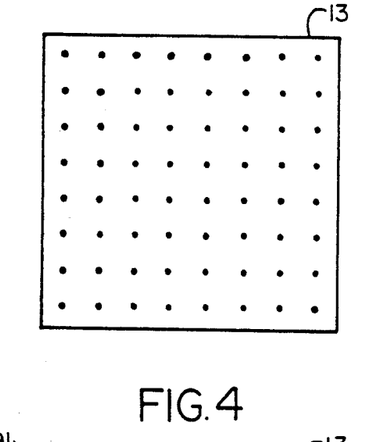
FIG. 4 is a display of a test pattern comprising a matrix of dots for use with an alternate embodiment employing a raster scanned camera sensor.
Figure 5:
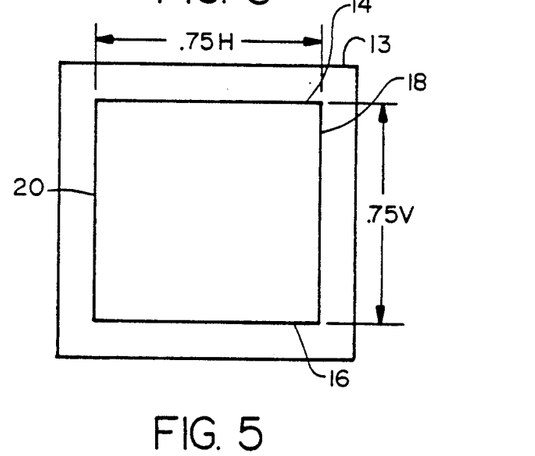
FIG. 5 is a test pattern used for initial adjustment in the preferred embodiment.

In operation, prior to scanning the test patterns of FIGS. 2, 3 or 4, adjustments using the test pattern of FIG. 5 are performed to first equalize raster size, rotation, and centering. Manual adjustments include electrical and mechanical adjustments which are standard for television receivers, such as horizontal and vertical centering for each color, horizontal and vertical deflection sweep linearity for each color, horizontal and vertical raster rotation for each color, horizontal and vertical size for each color, and brightness and contrast for each color. It will be noted that manual adjustments affecting size, rotation, and centering must be done for each color in a projector such as projector 11 because there are three separate CRTs. After manual adjustment, the convergence and color balance will be nearly correct in only a few areas of the display because the CRTs and their deflection coils have spatial linearity differences, and the CRTs have spatial brightness differences. Spatial brightness differences also arise from the use of light valves LV controlled by the CRT outputs.

In an embodiment where the scanner 73 is built into the projector 11, the vertical and horizontal pattern test patterns are next successively applied to each of the CRTs of the projector 11. The test patterns may be applied in various orders, for example, a green horizontal test pattern, followed by a red horizontal test pattern, followed by a blue horizontal test pattern, followed by a green vertical test pattern, followed by a red vertical test pattern, followed by a blue vertical test pattern.

Figure 6:
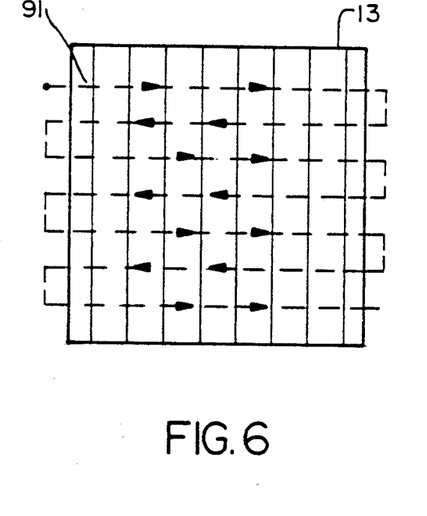
FIG. 6 illustrates a serpentine scan of the test pattern of FIG. 2.
Figure 7:
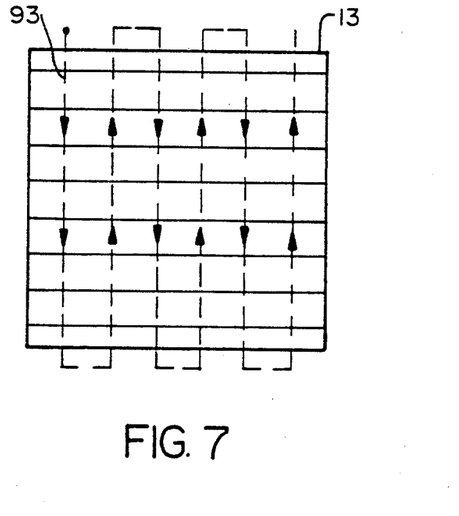
FIG. 7 illustrates a serpentine scan of the test pattern of FIG. 3.

Corresponding areas of these test patterns are scanned by the scanning system 73 and the differences in position between corresponding points on the test patterns for each CRT are determined. The scan of the test patterns is preferably carried out in a serpentine fashion, as shown in FIGS. 6 and 7, which respectively show a horizontal scan 91 of vertical test pattern lines to determine horizontal position and a vertical scan 93 of horizontal test pattern lines to determine vertical position. The manner in which this scanning is accomplished is illustrated in more detail in connection with FIGS. 8-10.

After the horizontal and vertical scans of the test patterns of FIGS. 2 and 3 are completed, the position differences between the colors are used by the image processor 61 to create error signals which drive the tickler coils RH, RV; GH, GV; BH, BV after D/A conversion. If a gain potentiometer 37 is set so that the tickler coil it controls provides insufficient correction to result in convergence with the standard color, the gain is increased until convergence is achieved. Likewise, if a tickler coil overcorrects, the gain is decreased until convergence is achieved. No further adjustment of the potentiometer is required unless the projector 11 and/or scanner 73 is moved with respect to the display screen 13.

Figure 8:
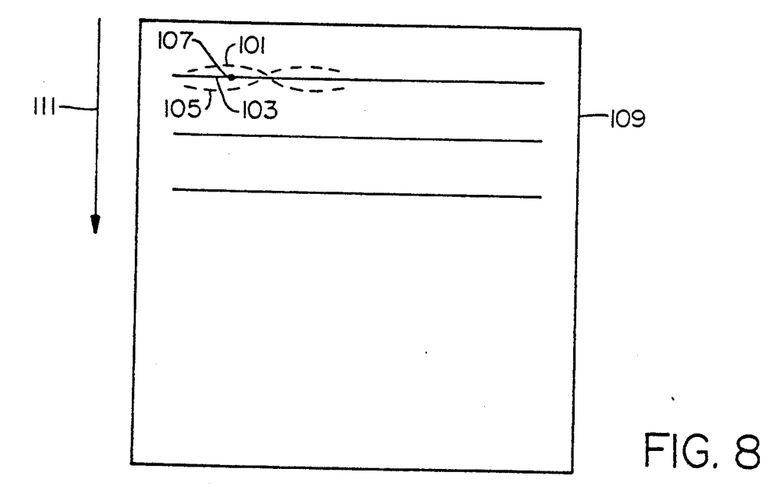
FIG. 8 is a front view of a display illustrating misconvergence about a point of interest.

FIG. 8 illustrates in more detail vertical scanning of the green, red and blue horizontal lines, 101, 103, 105, respectively. In FIG. 8, the red line 103 is shown passing through a point 107. The green line 101 and blue line 105 are shown as dashed lines, since they are not actually present on the screen or display 109 at the same time as the red line, but are superimposed thereon for tutorial purposes in the position they occupy with respect to each other. Thus, FIG. 8 illustrates misconvergence of the green and blue lines with the red line at the point 107. This misconvergence is exaggerated in the figure for illustrative purposes.

Figure 9:
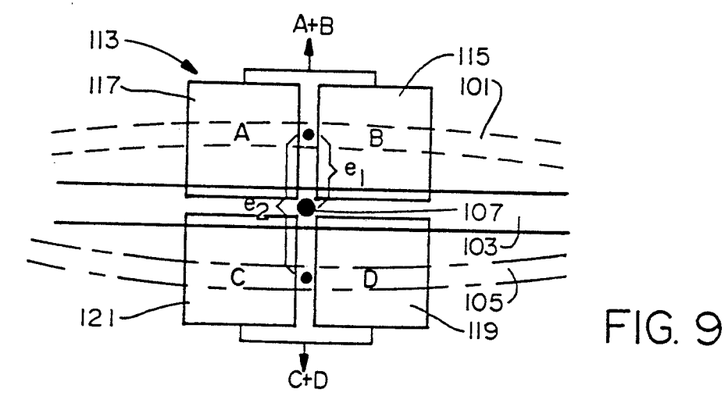
FIG. 9 is a schematic diagram illustrating vertical scanning across a quad diode sensor.

The scanning system 73 of FIG. 1 scans the screen in the vertical direction as indicated by the arrow 111 and focuses a small area about the point 107, e.g., 2-3 inches in width, on the light sensor 83, shown as a quad diode sensor 113 in FIG. 9. The quad sensor 113 includes four individual square sensor elements 115, 117, 119, 121. For scanning in the vertical direction, the outputs A and B of the first pair of horizontally adjacent sensor elements 115, 117 are added together to form a sum $A+B$, and the outputs of the second pair of horizontally adjacent sensors 119, 121 are added together to form a sum $C+D$. The difference of $A+B$ and $C+D$ is then formed, for example, by a differential amplifier or by sampling the A, B, C and D outputs, storing them in the memory 63, and combining them in the scan processor 91. When one of the horizontal lines 101, 103, 105 is centered on the quad sensor 113, the differential output $(A+B)-(C+D)$ of the sensor 113 is zero. In the example of FIG. 9, the red line 103 is centered on the quad sensor 113, so that the differential output of the sensor 113 is zero for the red line. When the green line 101 was previously scanned, a zero occurred in the differential output of the sensor 113 at a position closer to the top or "earlier" in the vertical scan, while a zero occurs in the scan of the blue scan line at a vertical position below that of the red "zero," i.e., somewhat "later" in the vertical scan. The differences in "zero" positions represent errors $e_1$ and $e_2$ by which the red CRT image and blue CRT image may be adjusted by the vertical tickler coils RV, BV to cause vertical convergence of the red and blue images with the green image in the area of point 107.

As previously discussed, in the preferred embodiment, the motor 75 is either a stepping motor or a motor equipped with an optical encoder, in either case providing a digital indication of the positions $P_1$, $P_2$ and $P_3$ where zeroes occurred during the scan of the green, red and blue lines in the screen area about point 107. These positions $P_1$, $P_2$, $P_3$ are stored in memory so that the image processor 61 may subtract them to compute and then store the error values $e_1 = P_1 - P_2$ and $e_2 = P_1 - P_3$.

After a serpentine vertical scan of the green, red and blue horizontal line test patterns, a matrix of zero points $p_{1xy}$, $p_{2xy}$ and $p_{3xy}$ has been stored for each test pattern. The errors $e_{1xy}$ and $e_{2xy}$ are then determined and stored for use in determininq vertical correction values for the tickler coils RV, BV.

Figure 10:
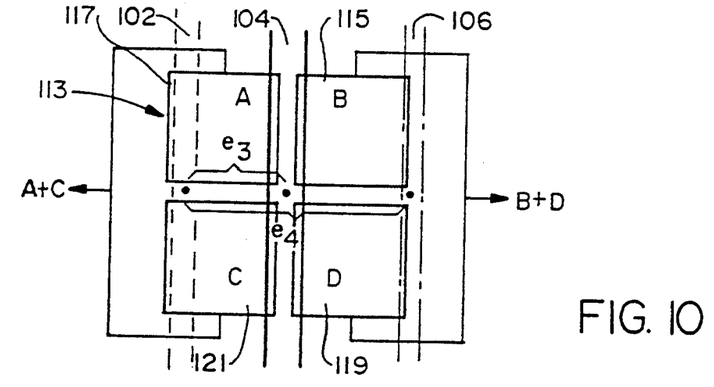
FIG. 10 is a schematic diagram illustrating horizontal scanning across a quad diode sensor.

Horizontal correction values are analogously determined using the green, red and blue vertical line test patterns scanned as shown in FIG. 6. Scanning of the green, red and blue vertical lines across the quad sensor 113 is shown in FIG. 10. For the scan position illustrated, the outputs of the two vertically adjacent square sensor elements 117, 121 are added to form an $A+C$ output, while the outputs of the two vertically adjacent square sensor elements 115, 119 are added to form a $B+D$ output. The $A+C$ and $B+D$ outputs are then subtracted to detect a zero output when one of the vertical color lines is centered on the sensor 113. In FIG. 10, line 104 is shown centered. Again, the outputs of the quad sensor 113 may be A/D converted and combined by the scan processor 91 to detect the zero point. As with the horizontal line pattern, a matrix of horizontal error position signals $e_{3xy}$, $e_{4xy}$ are determined and stored in the memory 63 to be used to determine correction values for the horizontal tickler coils RH, BH.

A limit test, e.g., $[A+B] > X$, is also performed in order to ensure that a zero is not detected in the low contrast area between test pattern color lines for both the horizontal and vertical scans.

Before projection, the image processor 61 utilizes the matrix of $e_1$, $e_2$, $e_3$ and $e_4$ correction values to digitally generate smoothly interpolated error curves. Various well-known interpolation approaches may be used. A simple linear interpolation works satisfactorily, although other more sophisticated curve fitting techniques could be employed. Digital values representing the error curves are stored in memory and outputted during projection in synchronism with the main deflection coil currents (uncorrected position), to provide the necessary tickler coil beam deflection correction, resulting in convergence.

Figure 11:
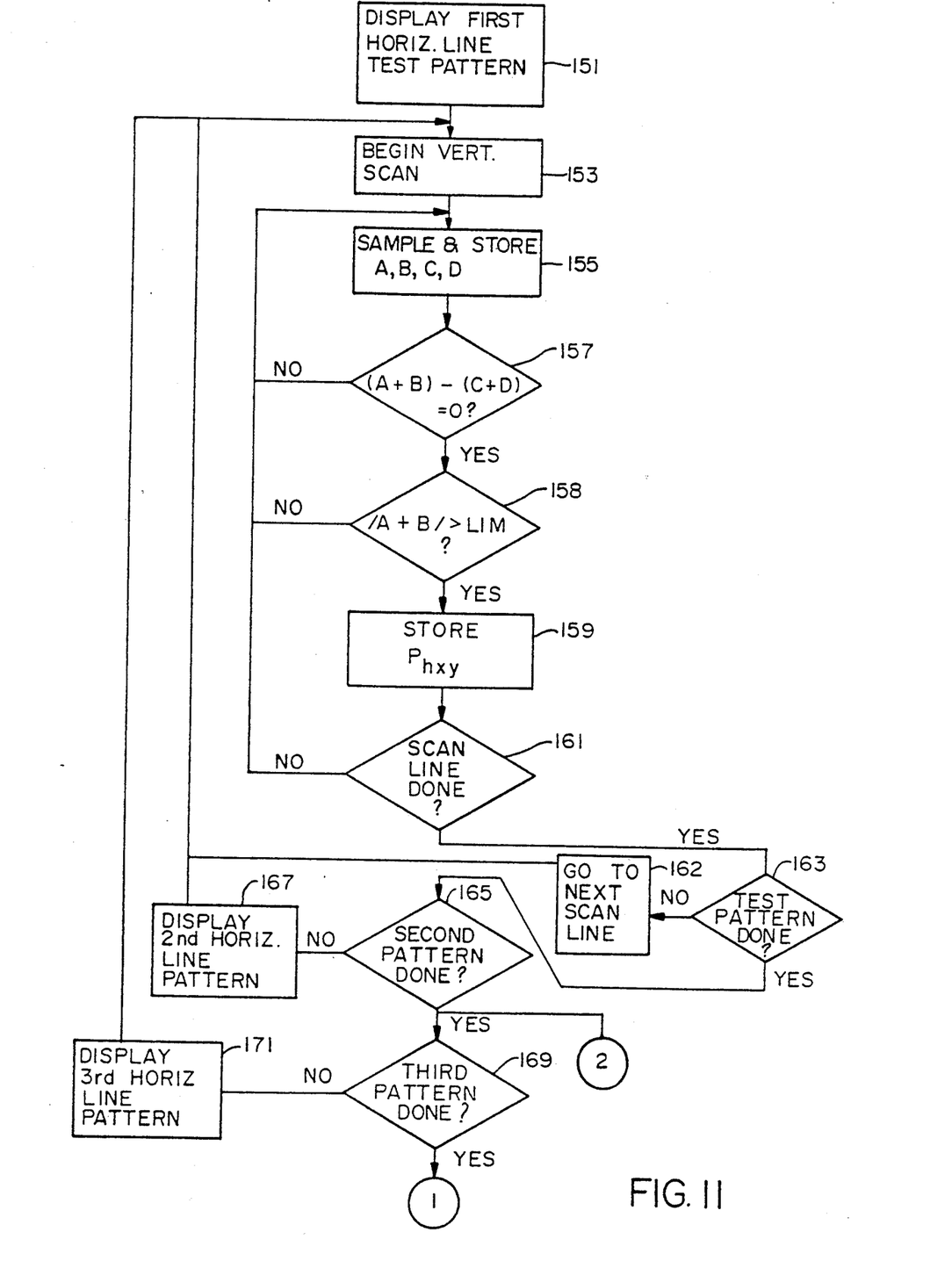
FIG. 11 is a flow chart illustrating programming of the scan processor of the preferred embodiment.
Figure 12:
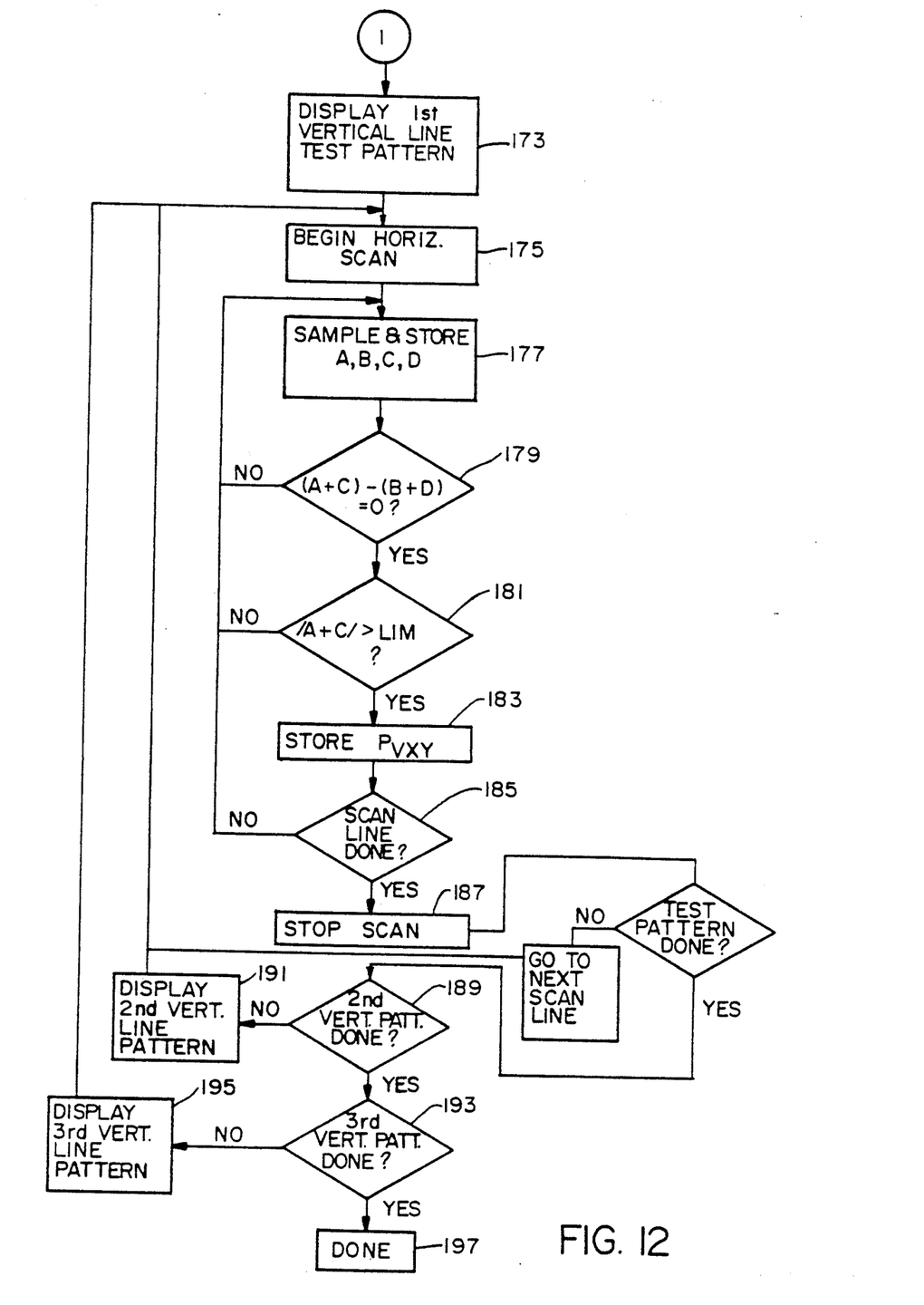
FIG. 12 is a continuation of the flow chart of FIG. 11.

FIGS. 11-12 illustrate flow charts for programming the scan processor 91 to perform vertical and horizontal serpentine scanning of the test patterns. In the first step 151, the scan processor 91 causes the test pattern generator 71 to generate the first horizontal line test pattern, which is supplied through the image processor 61 to the projector 11. The scan processor 91 then causes the motor and scan apparatus 73 to begin scanning down the first vertical line of the serpentine scan pattern, step 153. At selected intervals during the scan, the processor 91 causes the A/D converter to sample and store samples A, B, C and D of the output of the quad sensor 113, as indicated in step 155.

In steps 157 and 158, the samples are examined to determine whether a center of a horizontal line has been detected. In step 157, the quad sensor 113 samples A, B, C, D are appropriately added and subtracted to determine if a zero value indicative of the center is present. In step 158, a limit test is performed to determine whether a brightness level sufficiently above the background level has been detected, in order to assure that a horizontal line is being examined and not the background.

Assuming test 158 is satisfied, the position $P_{hxy}$ at which samples A, B, C and D were taken is stored in the memory 63. If the scan line has not been completed at step 161, the loop is repeated and additional samples stored until a scan has crossed and sampled the vertical position of all the horizontal lines in its path. At that point, the first test pattern has not been completed, and the scan processor 91 causes the scan apparatus 73 to begin the next vertical scanning of the first horizontal line test pattern, as indicated in step 162. If the first horizontal line test pattern has been completely scanned, a test is made at step 165 to determine whether the second horizontal test pattern has been completely scanned. If not, the second horizontal test pattern is displayed at step 167 and the scanning of that pattern is undertaken. If the second test pattern has been completely scanned, then the test 169 is made to determine whether the third horizontal test pattern has been completely scanned. If not, the third test pattern is displayed, step 171, and scanned. If the third test pattern has been completely scanned, the routine proceeds to FIG. 12 to display the first vertical line test pattern and begin horizontal scanning of that test pattern in similar fashion.

Figure 13:
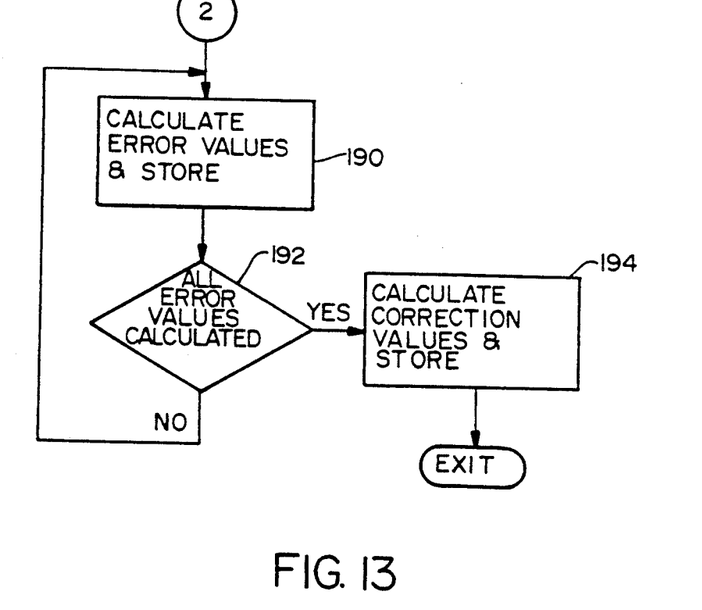
FIG. 13 is a flow chart illustrating programming of the image processor of the preferred embodiment.

FIG. 13 illustrates a flow chart to adapt the image processor 61 to cooperate With the scan processor 91 operation detailed in FIGS. 11 and 12. After the first two horizontal line test patterns have been displayed and scanned (step 165, FIG. 11), the image processor 61 is signalled by the scan processor 91 to begin determining the error values $e_{1xy}$, step 190. After the third horizontal line test pattern has been scanned, the image processor 61 begins to perform the error calculation routine, step 194, to determine the error values $e_{2xy}$. Similarly, the image processor 61 performs step 190 of the routine of FIG. 13 to determine the error values $e_{3xy}$, $e_{4xy}$ while the scan processor 91 is controlling scanning of the vertical line test patterns pursuant to FIG. 12. After the error values $e_{1xy}$, $e_{2xy}$, $e_{3xy}$, $e_{4xy}$ are all calculated and stored, the image processor 61 performs an interpolation routine, step 194, as previously described to determine and store the actual correction values to be used to control the outputs of the D/A converters 45–55 of FIG. 1.

If the scanner 73 is not built into the projector 11, the test pattern of FIG. 5 is also used to center the field of view of the scanning system 73 on the display. Centering is done by manually pointing the scanner 73 at the display and, with the horizontal scan mirror 81 in its center position, the vertical scan mirror 77 is moved from one extreme position to the other. As the mirror 77 is moved, a count is generated by the associated motor 79. The test pattern of FIG. 5 is known to have horizontal lines 14, 16 separated by 0.75 of the raster height so that the position and size (number of counts) of the vertical dimension are easily determined. As the vertical scan mirror 77 scans across the screen 73, the count output of the motor 79 begins at zero and counts incrementally. The counts or positions at which the scan encounters the first and second horizontal lines 14, 16 in FIG. 5 are each detected, as described in connection with FIGS. 7 and 9. The number of counts before intersecting the first horizontal line 14 and the number of counts after intersecting the second horizontal line 16 indicate the degree of centering of the display in the vertical direction. The percentage of total counts which occurs between the two lines is preferably at least 60% to obtain adequate scanner resolution.

When centering correction is required, the tilt of the mirrors 77, 81 is manually adjusted. Automatic adjustment of the tilt using the count information could also be provided. A character generator may also be provided, as known in the art, to display the count information on the screen 13 to provide visual feedback of the centering condition.

With the vertical scan mirror 77 fixed at its center position, the horizontal scan mirror 81 is then moved from one extreme position to the other across the vertical lines 18, 20 in a similar manner to determine the position and size of the horizontal display dimension. Centering in the horizontal direction is thus achieved by a procedure directly analogous to that used for centering in the vertical direction.

If the distances from the projector 11 and the scanner 73 to the display are fixed, and the scanner 73 is implemented with a high degree of absolute accuracy, the scanner 73 may be used to determine the size and shape of all three colored displays. If the scanner 73 is implemented only with a high order of repeatability, the color image which has the best linearity and orthogonality is chosen as the standard, and the other colors are compared with it.

Figure 14:
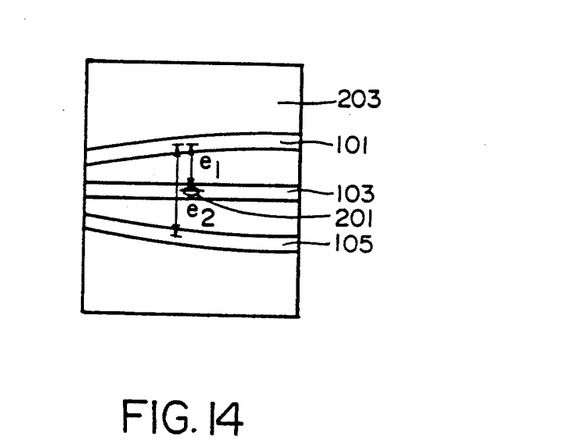
FIG. 14 illustrates a test element for scanning during projector operation.

In addition to providing initial convergence, the invention has the capability of maintaining convergence while normal program material is projected. This capability negates the otherwise deleterious effects of electronic and mechanical drift caused by temperature changes or vibration. This on-line convergence correction capability is accomplished by causing the projector 11 to project one of the test lines (or dots) in the standard color, for example, green, surrounded by a black area. To accomplish this, the scan processor 91 retrieves from the memory 63 the last recorded coordinates $P_{hxy}$, $P_{vxy}$ of a single color test element which were stored at steps 159 and 183 of FIGS. 11 and 12, respectively. The scan processor 91 directs the scanning apparatus to scan the close vicinity within the black illustrated in FIG. 14. Because the scan processor 91 knows where to direct the scan with a high degree of accuracy, the blacked out area 203 about the test element 201 can be relatively small and the scan time short, making the interruption of the normal video programming nearly imperceptible. The black area 203 around the test element must be larger than the scan size, unless sophisticated image recognition processing is performed in the image processor to discriminate against program material affecting the test element signal.

Each color, e.g., 101, 103, 105, is projected in turn, without correction, in the given black area 203 by the projector 11 and its position is detected and stored. As mentioned earlier, the scanning apparatus 73 counts from a repeatable reference limit switch actuation position to the standard color intersection position and to the other two color intersections. The scan processor 91 stores the data from which errors $e_{1xy}$, $e_{2xy}$, $e_{3xy}$ and $e_{4xy}$ are computed in similar fashion to that discussed above in connection with FIGS. 6–12. Correction values are calculated after the entire display has been scanned for the positions of all three colors. The new correction values replace the old values and are used to control the D/A outputs of the D/A converters 45–55 to restore exact convergence.

The scanned light sensor, spatial memory, and deflection related correction output signal capability of the invention also enables accurate and automatic spatial gray scale correction. For a fixed set of CRT electron beam control voltages, the light output of each CRT of the projector 11 will have some spatially related nonuniformity. The nonuniformity at the projection screen 13 may be further compounded by nonuniformities of the associated light valves LV and illumination lamp operation, and by optical element vignetting. Because the light sensor 83 is scanned with respect to the projected display and outputs intensity information when centered upon a small percentage of the display area under examination, it is not subject to vignetting error, and can thus be used for gray scale correction. Such correction capability is particularly useful in projector embodiments employing light valves, which do not turn on and off uniformly.

The method to be described employs the processor 61 to generate control signals supplied in real time to the video amplifiers 12 (FIG. 1) employed in conjunction with each CRT. Conventional video amplifiers typically have a threshold (brightness) potentiometer, a gain (contrast) potentiometer and a video input. The video amplifier of the preferred embodiment, however, has threshold Th and gain G inputs controlled by the image processor 61. According to the method to be described, offset correction values and gain control values are determined by the image processor 61 and supplied to the threshold control inputs Th and the gain control inputs G.

Figure 15A:
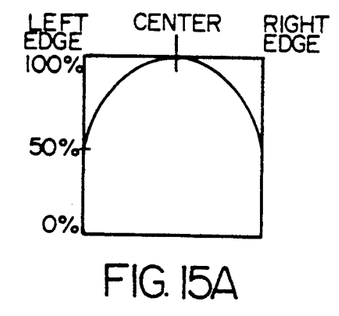
FIGS. 15A and 15B illustrate illumination profiles of a flat field test pattern.
Figure 15B:
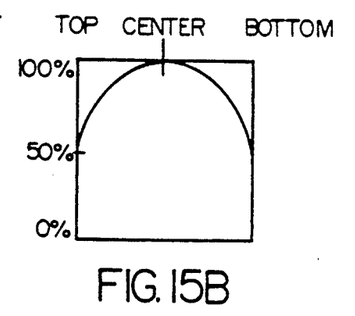

To determine the offset correction values, a flat field test pattern, i.e., a pattern having a constant brightness level control voltage, is first projected on the screen 11 in one of the three primary colors, which serves as a reference color. For example, the green flat field may be projected with an amplitude of approximately 100% of the maximum output. This pattern is then scanned by the scanning system 73 to determine its spatial illumination profile. This profile is outputted by the light sensor 73, sampled by the A/D 89 and stored in the memory 63. FIG. 15A shows the illumination profile of the 100% flat field test pattern scanned horizontally, left to right, while FIG. 15B shows the illumination profile of the same test pattern scanned vertically, or top to bottom. Both the horizontal and vertical profiles rise from a 50% level at the edges to 100% in the center of the screen 13, thus indicating the presence of a typical "hot spot" in the center of the screen 13.

After the spatial illumination profile of FIGS. 15A and 15B is stored in the memory 63, the amplitude in the center of the display is reduced to 1% of the amplitude of the originally scanned pattern by adjusting the threshold of the video amplifier 12 employed in the projector 11. This amplitude corresponds to the point at which the CRTs just turn on, i.e., the level "just next to the black," and therefore permits a threshold adjustment.

Figure 16A:
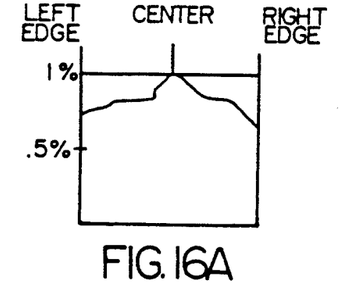
FIGS. 16A and 16B illustrate illumination profiles of a flat field test pattern.
Figure 16B:
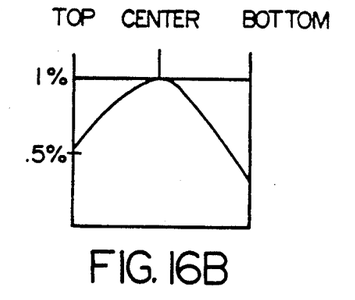

While the flat field pattern of the reference color is projected at the 1% level, the scanning system 73 scans the pattern and the resulting illumination profile is stored in the memory 63. The analog form of the profile of the 1% amplitude flat field pattern may appear as shown in FIGS. 16A and 16B. The amplitude offset, i.e., vertical offsets between the profiles of FIGS. 16A and 16B and FIGS. 15A and 15B, are determined by the image processor 61 and used to generate a set of offset correction values to be supplied to the threshold input Th of the associated video amplifier 12.

Figure 17A:
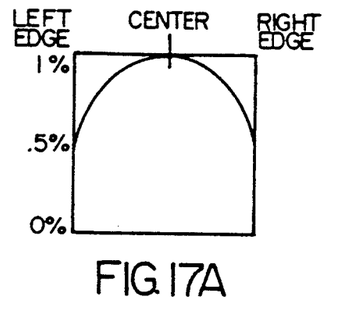
FIGS. 17A and 17B illustrate illumination profiles of a flat field test pattern.
Figure 17B:
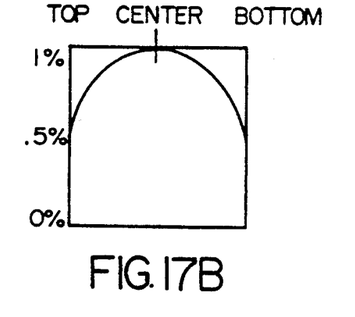

The desired result of supplying the offset correction values to the threshold inputs Th is to achieve an illumination profile curve at the 1% level which is identical in shape to that at the 100% level, as shown in FIGS. 17A and 17B. Since the first set of offset values typically will not achieve a match to the degree of accuracy desired, a second scan of the 1% illumination profile is made. During this second scan, the initial set of offset values is supplied to the Th inputs so that a second set of corrections to the initial values may be determined. Accordingly, the flat field test pattern at the 1% level for the reference color is again projected and scanned and a second illumination profile is generated for that reference color using the first set of offset values. The process is repeated until a set of offset values is reached which supply the desired correspondence between the contours of the 1% and 100% illumination profile, i.e., until the 1% illumination profile appears substantially as shown in FIGS. 17A and 17B.

The above procedure is then repeated to achieve two additional sets of offset correction values, one for each remaining primary color, using successive scans of flat field test patterns at the 1% level for each remaining color. The final spatial amplitude offset values for each color are stored in the memory 63. They are then read out by the image processor 61 at each position during the raster scan to dynamically control the video offset of the amplifiers 12. It may be noted that the light sensor 83 may be combined with a photopic filter to limit the dynamic range requirements of the electronics when sensing and storing images having intensity ratios of more than 100:1.

The video gain is also spatially controlled by the image processor 61. The video gain is spatially corrected during successive scans of flat field patterns for each color to match the shape of the 60% peak level profile, i.e., 60% of the levels shown in FIGS. 15A and 15B. Successive approximations of the desired amplitude correction values are generated during successive scans of flat field patterns for each color in the same manner described above in connection with generation of the offset correction values. Spatial interpolation calculations are performed by the image processor 61 to provide digitally based smooth amplitude correction curves which are again stored in the memory 63. The result of the threshold and gain correction is untinted gray levels over the entire amplitude range.

It will be appreciated from the foregoing that the preferred embodiment is subject to numerous adaptations and modifications without departing from the scope of the invention. Therefore, it is to be understood that, within the scope of the appended claims, the invention may be practiced other than as specifically described herein.

What is claimed is:

1. Apparatus for use in automatically correcting misconvergence of color images controlled by a plurality of cathode ray tubes (CRT's), the CRT's and their respective images being used in a color projector for creating a display on a projector screen in response to signals supplied to said projector, said CRT's including adjustment means responsive to correction signals for adjusting the position of said images, said apparatus comprising:

means for supplying said projector with an identical test pattern signal for each respective CRT, causing projection on said projector screen of a respective test pattern for each CRT;

means for detecting the difference in position between said respective test patterns at each of a plurality of locations on said screen and storing said differences for use in correcting said misconvergence, wherein said means for detecting comprises;

sensor means for producing a detection signal each time a portion of one of said test patterns is scanned across said sensor means;

scanning means for successively scanning an image of each of said plurality of locations across said sensor means and for generating a positional signal representing the position on said screen of a location scanned across said sensor means; and means for storing position values indicative of the position represented by said positional signal in response to production of said detection signal by said sensor means; and image processor means for processing said position values to generate correction values for said CRT's and for storing said correction values in said storing means; wherein said image processor means is further supplied with the output of said test pattern generator means and adds sync signals to said test pattern signals and translates the levels of said test pattern signals.

2. The apparatus of claim 1 wherein said image processor means further subtracts the position value of one color element from the position value of another color element to develop first and second error signals for each of said locations.

3. The apparatus of claim 2 wherein said image processor performs an interpolation of said error signals to generate final correction values for each of said CRT's.

4. The apparatus of claim 3 further comprising means for applying said final correction values to said adjustment means for automatically adjusting the position of said images to thereby correct for misconvergence prior to use of said projector.

5. The apparatus of claim 4 further comprising means for automatically maintaining convergence of said images during operation of said projector.

6. The apparatus of claim 5 further including means for automatically effecting spatial gray scale correction of said display.

7. A method for correcting misconvergence of a plurality of light images each projected on a display screen by a respective CRT in a color projector responsive to signals to position said light images so as to form a multicolor converged image therefrom on said display screen, said method comprising the steps of:

projecting an identical test pattern on said display screen for each said CRT;

detecting the relative differences in position between each test pattern at a plurality of locations on said display screen, said step of detecting including the step of automatically scanning light reflected from each of said plurality of locations across an image sensor;

generating convergence correction signals from said difference;

correcting the position of said images based on said difference;

wherein said step of detecting further includes the steps of:

generating a position count indicative of the position of each said location being scanned;

outputting a signal each time a test pattern crosses said image sensor;

storing the position count generated at the time of occurrence of said signal;

wherein said steps of displaying, generating, detecting and correcting are performed to correct misconvergence prior to operation of said projector with normal program material and further including the step of automatically correcting misconvergence during operation of said projector with normal program material;

wherein the step of automatically correcting misconvergence during operation of said projector comprises the steps of:

storing the positions of detection of said test patterns;

scanning a localized area about each of a plurality of positions;

projecting each color without correction in the selected localized area; and determining error values based on differences between each color in said localized area.

8. A method for correcting misconvergence of a plurality of light images each projected on a display screen by a respective CRT in a color projector responsive to signals to position said light images so as to form a multicolor converged image therefrom on said display screen; said method comprising the steps of:

projecting an identical test pattern on said display screen for each said CRT;

detecting the relative difference in position between each test pattern at a plurality of locations on said display screen, said step of detecting including the step of automatically scanning light reflected from each of said plurality of locations across an image sensor;

wherein said step of detecting further includes the steps of:

generating a position count indicative of the position of each said location being scanned;

outputting a signal each time a test pattern crosses said image sensor;

storing the position count generated at the time of occurrence of said signal; and automatically effecting spatial gray scale correction of said display;

wherein said step of automatically effecting gray scale correction includes the steps of:

scanning a projected flat field test pattern for a selected color having a first amplitude;

determining the spatial illumination profile of said flat field test pattern;

projecting a flat field test pattern at a second amplitude for each of said plurality of colors;

determining the spatial illumination profile for each flat field test pattern of the second amplitude; and generating amplitude offset values from said illumination profiles for causing the profile of the second amplitude pattern to match that of the first amplitude pattern.

9. The method of claim 8 wherein said first amplitude is 100% and said second amplitude is 1%.

10. The method of claim 8 wherein said first amplitude if 100% and said second amplitude is 60%.

11. The method of claim 8 further including the step of spatially correcting video gain such that a reduced illumination profile matches an unreduced illumination profile.

12. Apparatus comprising:
   a projection screen;
   a color projector positioned at a location spaced apart from said projection screen and including a plurality of cathode ray tubes (CRT's), each CRT generating and projecting a light beam of a selected single color, each said light beam being directed to said projection screen for creating a display on the projector screen in response to signals supplied to said projector, each CRT including adjustment means responsive to correction signals for adjusting the position of its respective light beam on said projection screen;
   means for supplying said projector with an identical test pattern signal for each respective CRT, causing projection on said projection screen of a respective test pattern light image for each CRT; and
   means for detecting the difference in position between the respective test pattern light images at each of a plurality of locations on said screen and storing said differences for use in correcting said misconvergence;
   said means for detecting comprising:
     sensor means for producing a detection signal each time a portion of one of said test patterns is scanned across said sensor means;
     scanning means position to receive light reflected off said projector screen for automatically successively scanning an image of each of said plurality of locations across said sensor means for generating a positional signal representing the position on said screen of a location scanned across said sensor means; and
     means for storing position values indicative of the position represented by said positional signal in response to production of a said detection signal by said sensor means;
   wherein each test pattern is scanned in serpentine fashion across said projector screen.

* * * * *